United States Patent
Ikematsu

(10) Patent No.: US 6,490,282 B1
(45) Date of Patent: Dec. 3, 2002

(54) SWITCHING SYSTEM FOR ASYNCHRONOUS TRANSFER MODE SWITCH

(75) Inventor: Ryuichi Ikematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/266,772

(22) Filed: Mar. 12, 1999

(30) Foreign Application Priority Data

Mar. 12, 1998 (JP) .......................................... 10-078577

(51) Int. Cl.⁷ .............................................. H04L 12/56
(52) U.S. Cl. .................................... 370/395.1; 370/411
(58) Field of Search ................................ 370/231, 235, 370/229, 232, 236, 237, 233, 235.1, 236.2, 238.1, 351, 352, 389, 399, 401, 402, 395.21, 395.3, 395.31, 395.4, 395.41, 395.42, 395.51, 395.71, 428, 412–419, 474, 465, 395.1, 219, 216, 220, 221, 226, 227, 228, 468, 535, 537, 411; 340/825.5, 825.01, 825.03, 827

(56) References Cited

U.S. PATENT DOCUMENTS

| 5,274,641 | A | * | 12/1993 | Shobatake et al. | .......... | 370/392 |
| 5,671,213 | A |   | 9/1997 | Kurano | ........................ | 370/218 |
| 5,751,695 | A |   | 5/1998 | Ohashi | ........................ | 370/218 |
| 5,774,453 | A |   | 6/1998 | Fukano et al. | ............... | 370/231 |
| 6,208,653 | B1 | * | 3/2001 | Ogawa et al. | ............... | 370/231 |

FOREIGN PATENT DOCUMENTS

| JP | 3-266547 | 11/1991 |
| JP | 4-29441 | 1/1992 |
| JP | 4-86043 | 3/1992 |
| JP | 5-336157 | 12/1993 |
| JP | 6-62036 | 3/1994 |
| JP | 7-74755 | 3/1995 |
| JP | 7-95213 | 4/1995 |
| JP | 8-139726 | 5/1996 |
| JP | 8-186575 | 7/1996 |
| JP | 8-288953 | 11/1996 |
| JP | 9-83529 | 3/1997 |
| JP | 9-224039 | 8/1997 |
| JP | 10-173678 | 6/1998 |
| JP | 10-190683 | 7/1998 |

* cited by examiner

Primary Examiner—Dang Ton
(74) Attorney, Agent, or Firm—Foley & Lardner

(57) ABSTRACT

A switching control cell is inserted into an input cell in a switching control cell generator. In a period between the detection of a switching control cell in a first or second switching control cell detector and the detection of the switching control cell in a third switching control cell detector, in active and stand-by switches, when a cell is discarded in any one of the active and stand-by switches, in addition to priority discard control, the same cell is discarded in the other switch independently of the priority discard control. Further, upon detection of a switching control cell in the switching control cell detector, all the cells accumulated within the cell buffer are discarded, and until the detection of the switching control cell in the switching control cell detector, reading from the cell buffer is stopped so that the same cell is written into the cell buffer in the active switch and the cell buffer in the stand-by switch. By virtue of the above constitution, a switching system for an asynchronous transfer mode switch supporting a plurality of discard priority classes can be provided which realizes hitless switching.

6 Claims, 8 Drawing Sheets

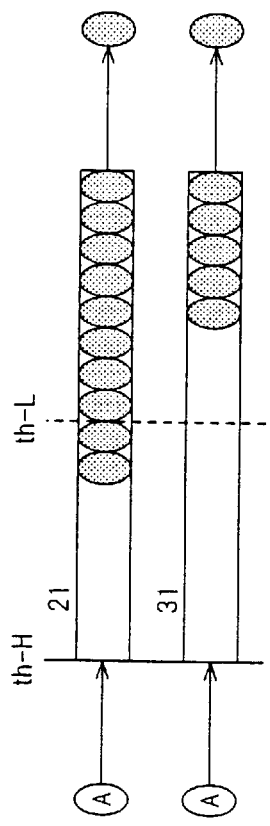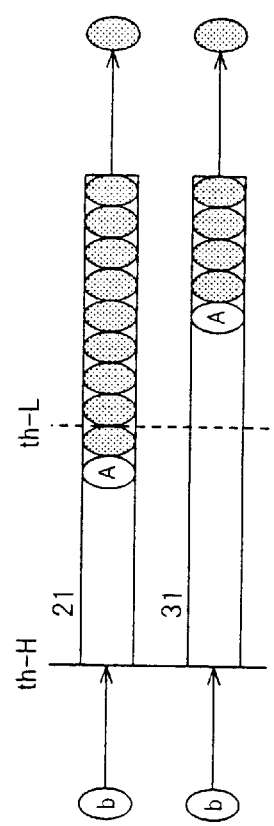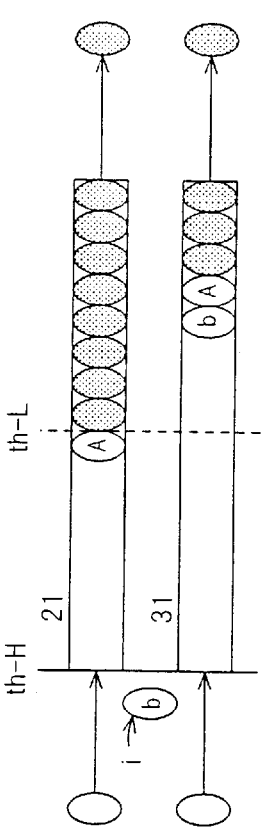

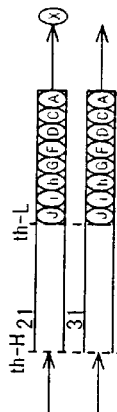
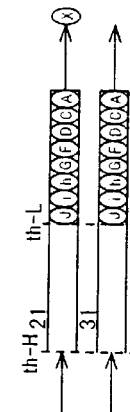
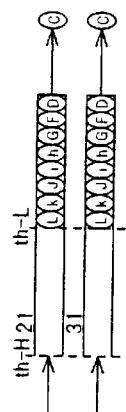

FIG.6A
FIG.6B
FIG.6C
FIG.6D

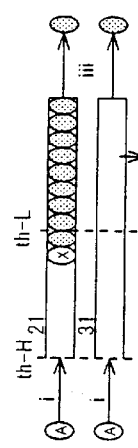
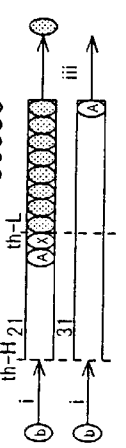
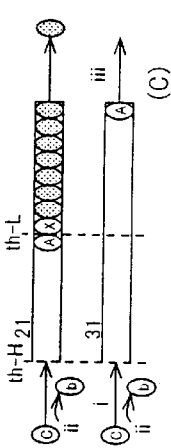

FIG.6E
FIG.6F
FIG.6G (A)
X,Y: SWITCHING CONTROL CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE (B)
A: DISCARD HIGH PRIORITY CLASS CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE
i: STOP OF PRIORITY CONTROL
ii: DISCARD
iii: STOP OF READ
X,Y: SWITCHING CONTROL CELL (C)
A: DISCARD HIGH PRIORITY CLASS CELL
b: DISCARD LOW PRIORITY CLASS CELL
X: SWITCHING CONTROL CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE
i: STOP OF PRIORITY CONTROL
ii: DISCARD
iii: STOP OF READ (D)
A: DISCARD HIGH PRIORITY CLASS CELL
b: DISCARD LOW PRIORITY CELL
C: DISCARD HIGH PRIORITY CELL
X: SWITCHING CONTROL CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE
i: STOP OF PRIORITY CONTROL
ii: DISCARD
iii: STOP OF READ (E)
k: DISCARD LOW PRIORITY CLASS CELL
X: SWITCHING CONTROL CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE (F)
A: DISCARD HIGH PRIORITY CLASS CELL
L: DISCARD LOW PRIORITY CLASS CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE
iv: RESTART OF PRIORITY CONTROL
vi: RESTART OF READ (G)
C: DISCARD HIGH PRIORITY CLASS CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE

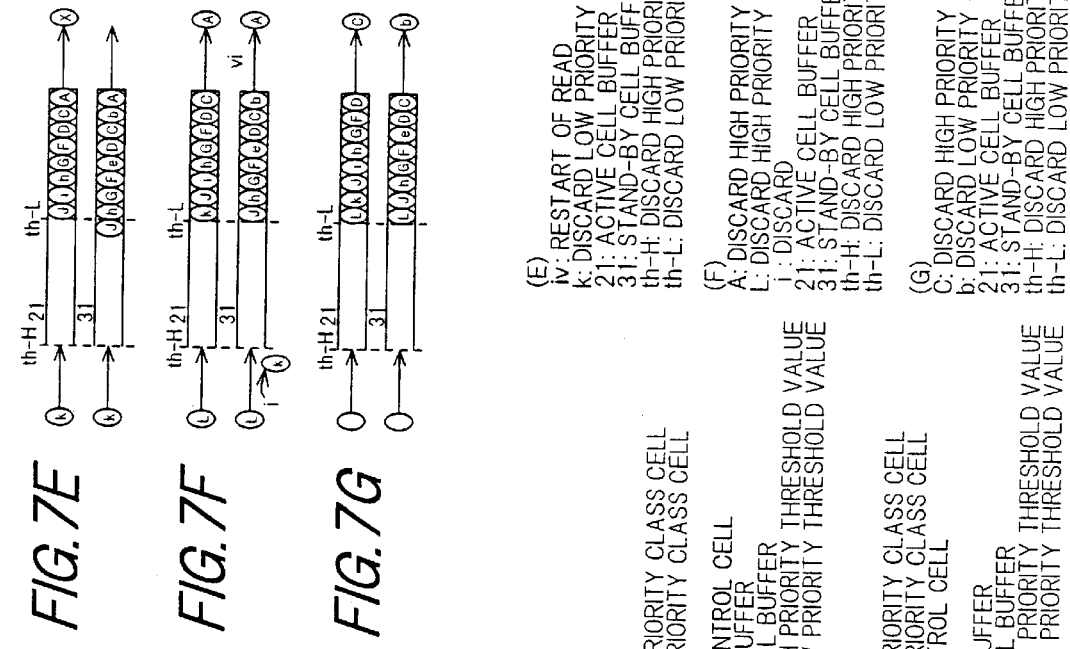
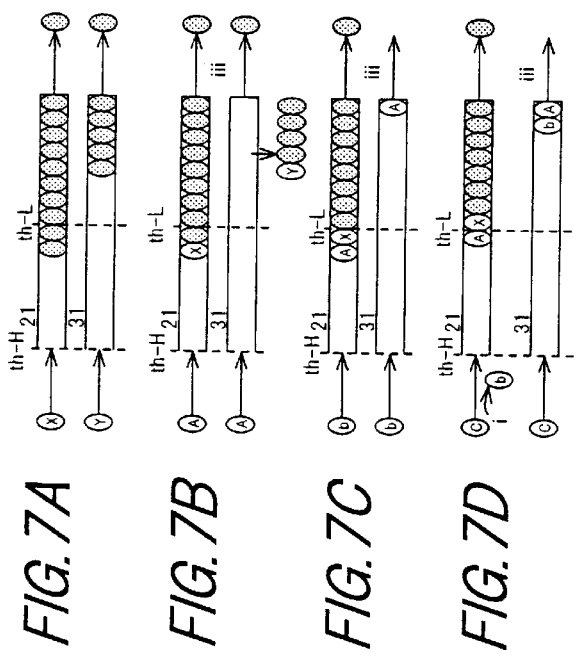

FIG.7A
FIG.7B
FIG.7C
FIG.7D
FIG.7E
FIG.7F
FIG.7G (A)
X,Y: SWITCHING CONTROL CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE (B)
A: DISCARD HIGH PRIORITY CLASS CELL
i: DISCARD
ii: STOP READ
X,Y: SWITCHING CONTROL CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE (C)
A: DISCARD HIGH PRIORITY CLASS CELL
b: DISCARD LOW PRIORITY CLASS CELL
ii: STOP OF READ
X,Y: SWITCHING CONTROL CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE (D)
A: DISCARD HIGH PRIORITY CLASS CELL
C: DISCARD HIGH PRIORITY CLASS CELL
X: SWITCHING CONTROL CELL
i: DISCARD
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE (E)
iv: RESTART OF READ
k: DISCARD LOW PRIORITY CLASS CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE (F)
A: DISCARD HIGH PRIORITY CLASS CELL
L: DISCARD HIGH PRIORITY CLASS CELL
i: DISCARD
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE (G)
C: DISCARD HIGH PRIORITY CLASS CELL
b: DISCARD LOW PRIORITY CLASS CELL
21: ACTIVE CELL BUFFER
31: STAND-BY CELL BUFFER
th-H: DISCARD HIGH PRIORITY THRESHOLD VALUE
th-L: DISCARD LOW PRIORITY THRESHOLD VALUE

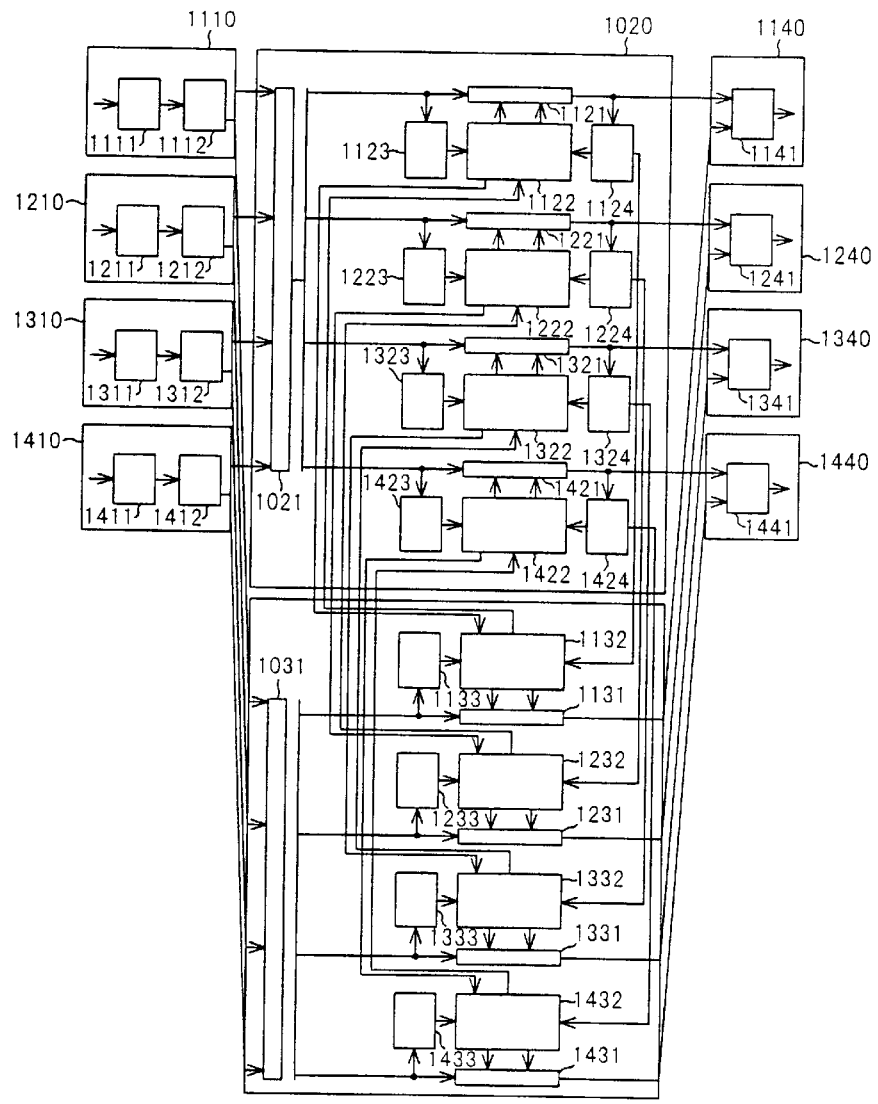

FIG.8

1020: ACTIVE SWITCH
1021: CELL MULTIPLEXING CIRCUIT
1030: ACTIVE SWITCH
1031: CELL MULTIPLEXING CIRCUIT
1110: INPUT INTERFACE
1111: SWITCHING CONTROL CELL GENERATOR
1112: BRANCH CIRCUIT
1121: CELL BUFFER
1122: BUFFER CONTROLLER
1123: SWITCHING CONTROL CELL DETECTOR
1124: SWITCHING CONTROL CELL DETECTOR
1131: CELL BUFFER
1132: BUFFER CONTROLLER
1133: SWITCHING CONTROL CELL DETECTOR
1140: OUTPUT INTERFACE
1141: SELECTING CIRCUIT
1211: SWITCHING CONTROL CELL GENERATOR
1212: BRANCH CIRCUIT
1221: CELL BUFFER
1222: BUFFER CONTROLLER
1223: SWITCHING CONTROL CELL DETECTOR
1224: SWITCHING CONTROL CELL DETECTOR
1231: CELL BUFFER
1232: BUFFER CONTROLLER
1233: SWITCHING CONTROL CELL DETECTOR
1240: OUTPUT INTERFACE
1241: SELECTING CIRCUIT
1310: INPUT INTERFACE
1311: SWITCHING CONTROL CELL GENERATOR
1312: BRANCH CIRCUIT
1321: CELL BUFFER
1322: BUFFER CONTROLLER
1323: SWITCHING CONTROL CELL DETECTOR
1324: SWITCHING CONTROL CELL DETECTOR
1331: CELL BUFFER
1332: BUFFER CONTROLLER
1333: SWITCHING CONTROL CELL DETECTOR
1340: OUTPUT INTERFACE
1341: SELECTING CIRCUIT
1410: INPUT INTERFACE
1411: SWITCHING CONTROL CELL GENERATOR
1412: BRANCH CIRCUIT
1421: CELL BUFFER
1422: BUFFER CONTROLLER
1423: SWITCHING CONTROL CELL DETECTOR
1424: SWITCHING CONTROL CELL DETECTOR
1431: CELL BUFFER
1432: BUFFER CONTROLLER
1433: SWITCHING CONTROL CELL DETECTOR
1440: OUTPUT INTERFACE
1441: SELECTING CIRCUIT

SWITCHING SYSTEM FOR ASYNCHRONOUS TRANSFER MODE SWITCH

FIELD OF THE INVENTION

The invention relates to a switching system for an asynchronous transfer mode (ATM) switch duplexed in an apparatus. More particularly, the invention relates to a hitless switching system for an ATM switch having the function of discard priority control.

BACKGROUND OF THE INVENTION

Japanese Patent Laid-Open No. 83529/1997 discloses, as this type of a conventional switching system for an ATM switch, "ATM cell flow controller" that realizes hitless switching in a duplexed transmission path. In this ATM cell flow controller, received signals of two systems having respective phases shifted due to the influence of a difference in path between duplexed transmission paths are subjected to delay adjustment to equalize the duplexed received signals to each other in the same phase, thus realizing hitless switching. A phase comparator circuit is disposed between a polishing circuit to avoid such an unfavorable phenomenon that the phase comparator is not properly operated due to the influence of cell discard created in the polishing circuit.

Further, Japanese Patent Laid-Open No. 186575/1996 discloses a "hitless switching system" that can realize hitless switching of duplexed transmission paths. In this hitless switching system, as with the above conventional ATM cell flow controller, received signals of two systems respectively having shifted phases are subjected to delay adjustments to equalize duplexed received signals in the same phase, thus realizing hitless switching. Further, phase comparison is performed based on received time of a monitoring cell inserted by a transmitter provided upstream of the transmission path.

Japanese Patent Laid-Open No. 139726/1996 discloses an "ATM switch system" that realizes hitless switching of a duplexed ATM switch in an apparatus. In this ATM switch system, the number of cells accumulated in an active switch is compared with the number of cells accumulated in a stand-by switch. When the number of cells accumulated in the active switch is larger than the number of cells accumulated in the stand-by switch, reading of cell from the stand-by switch is stopped by the difference in the number of accumulated cells. On the other hand, when the number of cells accumulated in the active switch is smaller than the number of cells accumulated in the stand-by switch, the read address of the stand-by switch is read in advance by the difference in accumulated cell to equalize the amount of the accumulated cell in the stand-by switch to the amount of the accumulated cell in the active switch, thus realizing hitless switching.

FIGS. 1 and 2 show a block diagram showing the "ATM switch system" disclosed in Japanese Patent Laid-Open No. 139726/1996. The ATM switch system shown in FIG. 1 comprises a T cell insertion circuit 311 corresponding to the switching control cell, a branch circuit 312, an active switch 320, a stand-by switch 330, and a selecting circuit 341. The active switch 320 comprises a buffer 331, a T cell detection circuit 322, and a detection circuit 323 for the number of residence cells. The stand-by switch 330 comprises a buffer 331, a T cell detection circuit 322, a detection circuit 333 for the number of residence cells, a differential computation circuit 334, and a read control circuit 335.

The ATM switch system shown in FIG. 2 comprises, in addition to the elements constituting the ATM switch system shown in FIG. 1, a threshold comparator circuit 336 provided the stand-by switch 330.

Both the "ATM cell flow controller" disclosed in Japanese Patent Laid-Open No. 83529/1997 and the "hitless switch system" disclosed in Japanese Patent Laid-Open No. 186575/1996 realize hitless switching of a duplexed transmission path. In both cases, however, phases of input signals of two systems having different phases are equalized to realize hitless switching. Therefore, these cannot be applied to hitless switching of an ATM switch.

In the "ATM switch system" disclosed in Japanese Patent Laid-Open No. 139726/1996, during the equalization of the number of cells accumulated in the active switch to the number of cells accumulated in the stand-by switch, when the number of accumulated cells exceeds, only in one switch, the threshold value for the discard low priority class, for an input cell belonging to the discard low priority class, cell discard is performed in the switch system wherein the number of accumulated cells exceeds the threshold value, while, in the other switch system, cell accumulation is performed. Therefore, at the time of the completion of the equalization, the number of cells belonging to the discard low priority class accumulated in one of the switch systems is different from that in the other switch system. This poses a problem that application to an ATM switch having the function of discard priority control cannot realize hitless switching.

In the construction shown in FIG. 2, a circuit for comparison of threshold values is provided. The threshold value used in this circuit is not for discard priority control but for judgement of whether or not the state of the accumulated cells should be equalized, here again posing a problem that hitless switching cannot be realized.

SUMMARY OF THE INVENTION

Accordingly, it is an object of the invention to provide a switching system for an ATM switch that, in an ATM switch having the function of discard priority control, can realize hitless switching.

According to a first aspect of the invention, a switching system for an ATM switch, comprises:

an input interface comprising a switching control cell generator for inserting a switching control cell into an input cell, and a branch circuit for branching a signal with the switching control cell inserted therein into two parts which are then output from the switching control cell generator and are input respectively into an active switch and a stand-by switch, said active switch comprising a cell buffer for accumulating the cell received from the branch circuit, a buffer controller for controlling writing into the cell buffer and reading from the cell buffer, a first active switching control cell detector for detecting the switching control cell from a row of cells received from the branch circuit and notifying the buffer controller of the switch control cell detection, and a second active switching control cell detector for detecting the switching control cell from a row of cells output from the cell buffer and notifying the buffer controller and the stand-by buffer controller of the switching control cell detection, the stand-by switch comprising a cell buffer for accumulating the cell received from the branch circuit, a buffer controller for controlling writing into the cell buffer and reading from the cell buffer, and a stand-by switching control cell detector for detecting the switching control cell from a row of cells received from the branch circuit and notifying the buffer controller of the switch control cell detection; and an output interface having a selecting circuit for selecting the output from any one of the active switch and the stand-by switch, wherein the active buffer controller discriminates the discard priority class of the input cell and controls the write or discard of the input cell according to the number of cells accumulated within the cell buffer and, when the input cell is discarded, notifies the stand-by buffer controller of the discard of the input cell, and, in a period between the receipt of a notification of switching control cell detection from the first active switching control cell detector and the receipt of a notification of switching control cell detection from the second active switching control cell detector, performs, in addition to the discard priority control, the discard control of the corresponding input cell upon a notification of the discard of the input cell from the stand-by buffer control, and the stand-by buffer controller discriminates the discard priority class of the input cell to control the write or discard of the input cell according to the number of cells accumulated within the cell buffer, and, at the time of discard of the input cell, notifies the active buffer controller of the discard of the input cell, and, further, in a period between the receipt of a notification of switching control cell detection from the stand-by switching control cell detector and the receipt of a notification of switching control cell detection from the second active switching control cell detector, performs, in addition to the discard priority control, the discard control of the corresponding input cell upon the receipt of a notification of the discard of the input cell from the active buffer control, and, upon the receipt of a notification of switching control cell detection from the stand-by switching control cell detection, discards the input switch control cell and all the cells already accumulated within the stand-by cell buffer to empty the cell buffer, and, further, in this case, until the receipt of a notification of switching control cell detection from the second active switching control cell detector, stops reading of cells from the stand-by cell buffer to equalize the cell accumulated within the active cell buffer to the cell accumulated within the stand-by cell buffer.

According to a second aspect of the invention, a switching system for an ATM switch, comprises:

an input interface comprising a switching control cell generator for inserting a switching control cell into an input cell, and a branch circuit for branching a signal with the switching control cell inserted therein into two parts which are then output from the switching control cell generator and are input respectively into an active switch and a stand-by switch, said active switch comprising a cell buffer for accumulating the cell received from the branch circuit, a buffer controller for controlling writing into the cell buffer and reading from the cell buffer, and a first switching control cell detector for detecting the switching control cell from a row of cells output from the cell buffer and notifying the stand-by buffer controller of the switching control cell detection, the stand-by switch comprising a cell buffer for accumulating the cell received from the branch circuit, a buffer controller for controlling writing into the cell buffer and reading from the cell buffer, and a second switching control cell detector for detecting the switching control cell from a row of cells received from the branch circuit and notifying the buffer controller of the switch control cell detection; and an output interface having a selecting circuit for selecting the output from any one of the active switch and the stand-by switch, wherein the active and stand-by buffer controllers each discriminate the discard priority class of the input cell and control the write or discard of the input cell according to the number of cells accumulated within the active and stand-by cell buffers; when cell discard control is performed in one of the active and stand-by cell buffers, control for discard of the corresponding input cell is performed in the other cell buffer; upon receipt of a notification of switching control cell detection from the second switching control cell detector, the stand-by buffer controller discards all the cells already accumulated within the stand-by cell buffer to empty the cell buffer, and, further, in this case, until the receipt of a notification of switching control cell detection from the first switching control cell detection, stops reading of cells from the stand-by cell buffer to control equalization of cells accumulated within the active and stand-by cell buffers.

According to the invention, when the input cell in one system is discarded, the corresponding cells in the other system is discarded. This can avoid occurrence of cell discard in one system alone and can equalize the cell accumulated in the active cell buffer to the cell accumulated in the stand-by cell buffer.

BRIEF DESCRIPTION OF THE DRAWINGS

The invention will be explained in more detail in conjunction with appended drawings, wherein:

FIGS. 5A–5C are diagram illustrating the operation of ordinary discard priority control;

FIGS. 6A–6G are diagram illustrating the transition of the state of cell accumulation according to the first preferred embodiment of the invention;

FIGS. 7A–7G are diagrams illustrating the transition of the state of cell accumulation in the case where the invention is not carried out; and FIG. 8 is a block diagram showing a preferred embodiment of the switching system for an ATM switch according to the invention.

DESCRIPTION OF THE PREFERRED EMBODIMENTS

Before describing the switching system for an ATM switch according to preferred embodiments of the invention, the conventional switching systems for an ATM switch will be explained in conjunction with FIGS. 1 and 2.

Figure 1:
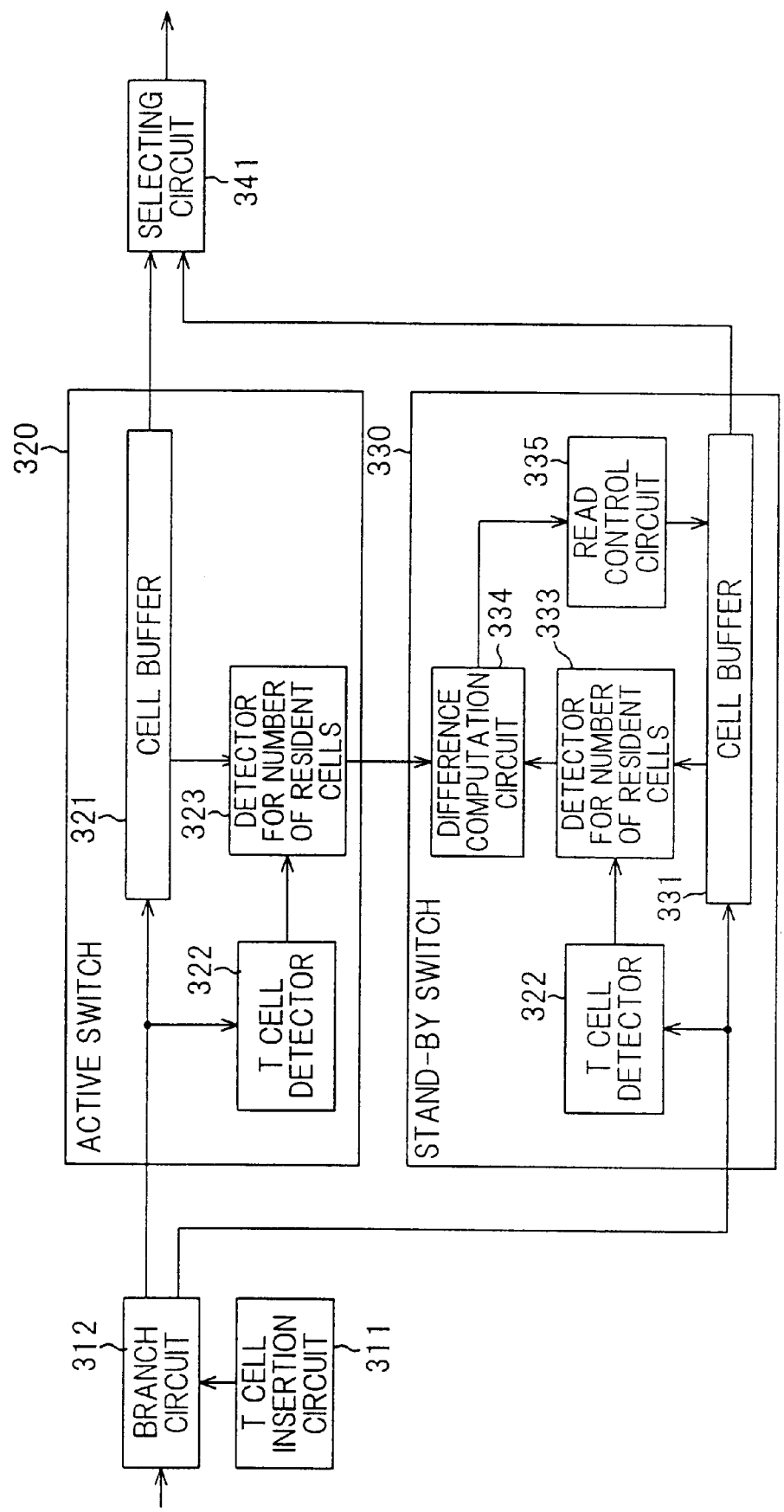
FIG. 1 is a block diagram showing a conventional switching system for an ATM switch.
Figure 2:
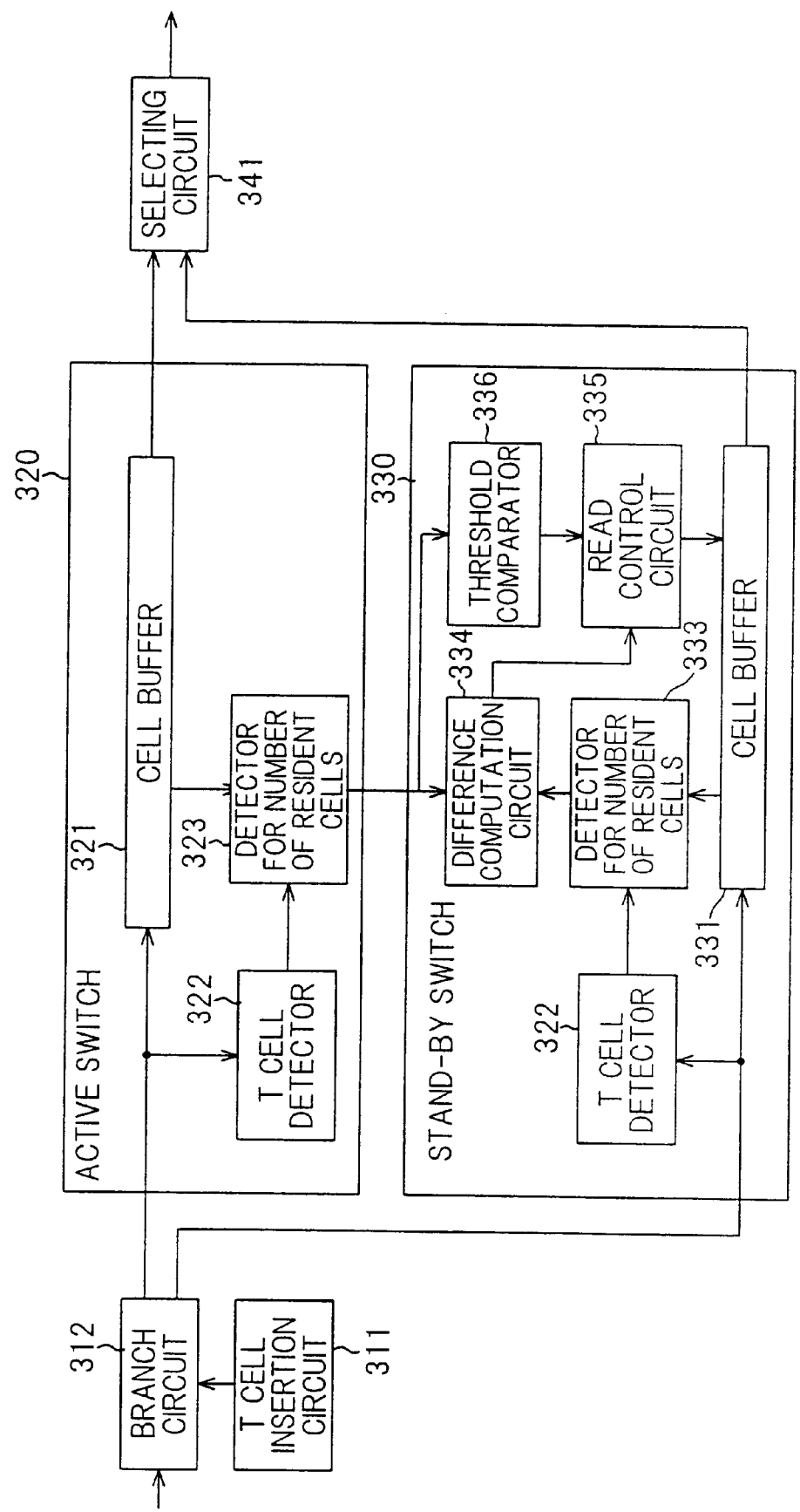
FIG. 2 is a block diagram showing another conventional switching system for an ATM switch.

FIGS. 1 and 2 are block diagrams showing conventional ATM switch systems. The ATM switch system shown in FIG. 1 comprises a T cell insertion circuit 311 corresponding to a switching control cell, a branch circuit 312, an active switch 320, a stand-by switch 330, and a selecting circuit 341. The active switch 320 comprises a buffer 321, a T cell detection circuit 322, and a detection circuit 323 for the number of residence cells. The stand-by switch 330 comprises a buffer 331, a T cell detection circuit 332, a detection circuit 333 for the number of residence cells, a differential computation circuit 334, and a read control circuit 335.

The conventional ATM switch system shown in FIG. 2 comprises, in addition to the elements constituting the ATM switch system shown in FIG. 1, a threshold comparator circuit 336 provided the stand-by switch 330.

Switching systems for an ATM switch according to the preferred embodiments of the invention will be explained.

Figure 3:
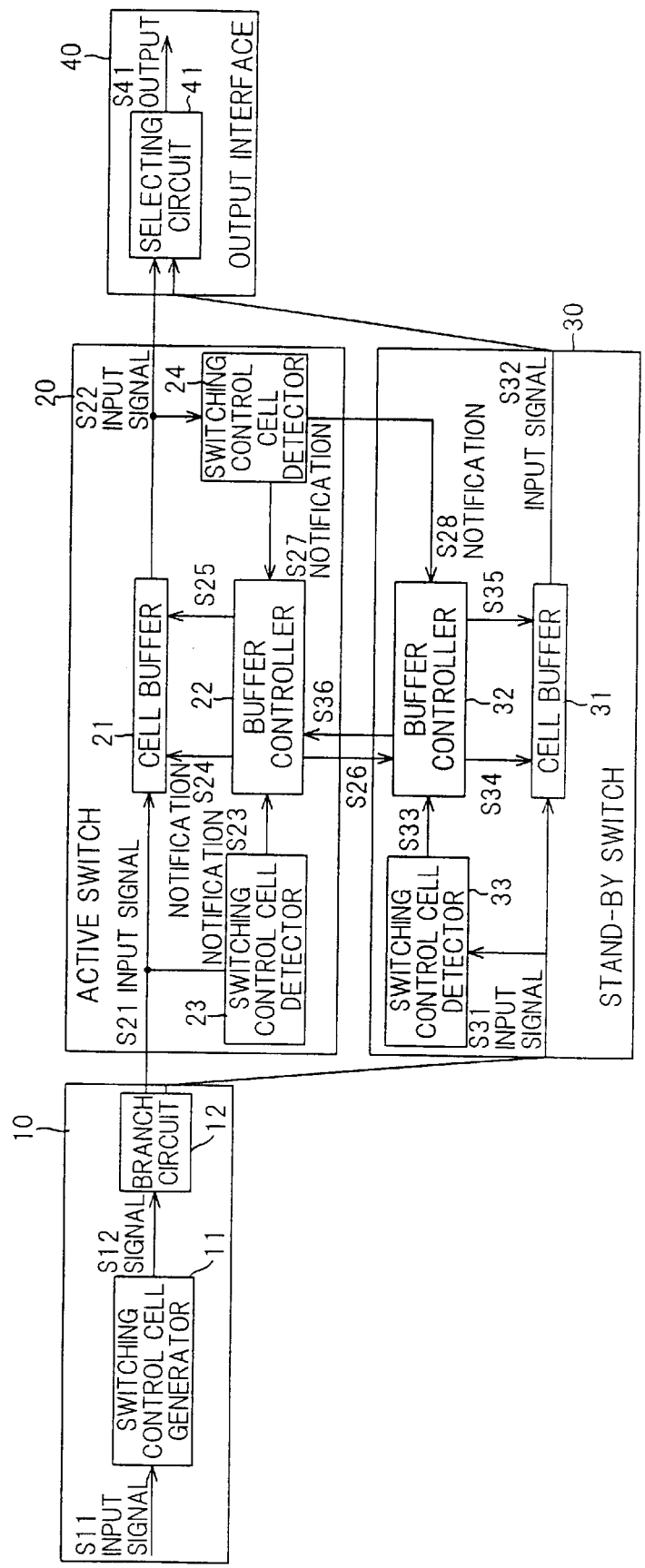
FIG. 3 is a block diagram showing a first preferred embodiment of the switching system for an ATM switch according to the invention.

FIG. 3 is a block diagram showing the hitless switching system according to a first preferred embodiment of the invention. For facilitating understanding of the invention, a hitless switching system will be explained wherein the system has one input interface and one output interface.

In FIG. 3, an input interface 10 comprises: a switching control cell generator 11 for inserting a switching control cell, used as a timing signal for the operation of equalization in a switch, into an input signal S11; and a branch circuit 12 for branching a signal S12 containing the switching control cell equally into an active switch 20 and a stand-by switch 30.

The active switch 20 comprises: a cell buffer 21 for accumulating an input cell; a buffer controller 22 for writing of cell into the cell buffer 21 and reading of cell from the cell buffer 21; a first switching control cell detector 23 for detecting a switching control cell from the input signal S21 and notifying the buffer controller 22 of the switching control cell detection; and a second switching control cell detector 24 for detecting a switching control cell from a row of cells read from the cell buffer 21 and notifying the buffer controller 22 and the stand-by buffer controller 32 of the switching control cell detection. In a general construction, the cell buffer 21 and the buffer controller 22 are provided for each input interface 10 or each output interface 40. In the embodiment shown here, however, a pair of cell buffer 21 and buffer controller 22 is provided for one input interface 10 and one output interface 40.

The stand-by switch 30 comprises: a cell buffer 31 for accumulating an input cell; a buffer controller 32 for controlling writing of cell into the cell buffer 31 and reading of cell from the cell buffer 31; and a first switching control cell detector 33 for detecting a switching control cell from a row of cells of the input signal S31 and notifying the buffer controller 32 of the switching control cell detection. In a general construction, the cell buffer 31 and the buffer controller 32 are provided for each input interface 10 or each output interface 40. In the embodiment shown here, however, a pair of cell buffer 31 and buffer controller 32 is provided for one input interface 10 and one output interface 40.

The output interface 40 has a selecting circuit 41 that, upon an instruction from an apparatus monitoring controller (not shown), selects an input signal S22 from the active switch 20 and an input signal S32 from the stand-by switch 30 which are then output (S41).

Figure 4:
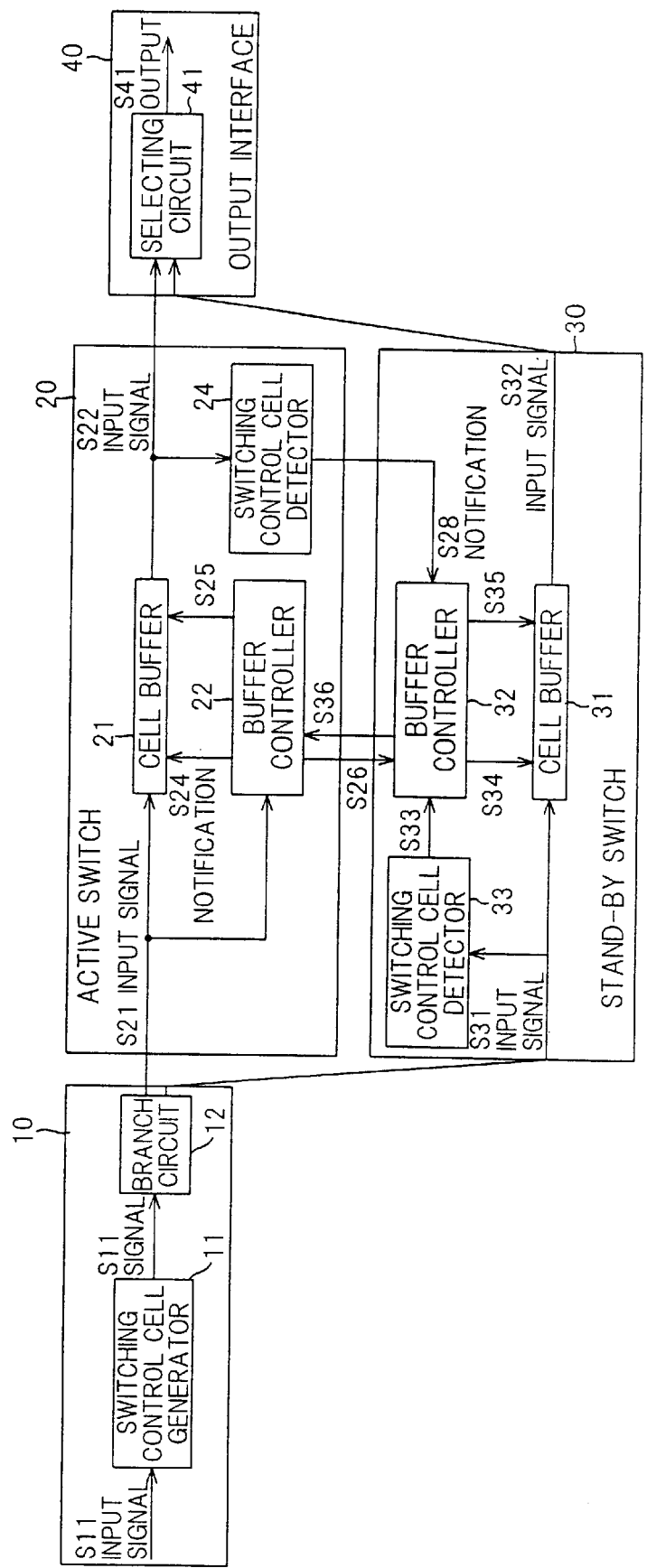
FIG. 4 is a block diagram showing a second preferred embodiment of the switching system for an ATM switch according to the invention.

FIG. 4 is a block diagram showing the hitless switching system according to a second preferred embodiment of the invention. As with the first preferred embodiment, for facilitating understanding of the invention, a hitless switching system will be explained wherein the system has one input interface and one output interface. The second preferred embodiment of the invention is different from the first preferred embodiment (FIG. 3) in that the first switching control cell detector 23 in the active switch 20 has been eliminated.

In FIG. 4, an input interface 10 comprises: a switching control cell generator 11 for inserting a switching control cell, used as a timing signal for the operation of equalization in a switch, into an input signal S11; and a branch circuit 12 for branching a signal S12 containing the switching control cell equally into an active switch 20 and a stand-by switch 30.

The active switch 20 comprises: a cell buffer 21 for accumulating an input cell; a buffer controller 22 for controlling writing of cell into the cell buffer 21 and reading of cell from the cell buffer 21; and a second switching control cell detector 24 for detecting a switching control cell from a row of cells read from the cell buffer 21 and notifying the buffer controller 22 and the stand-by buffer controller 32 of the switching control cell detection. In a general construction, the cell buffer 21 and the buffer controller 22 are provided for each input interface 10 or each output interface 40. In the embodiment shown here, however, a pair of cell buffer 21 and buffer controller 22 is provided for one input interface 10 and one output interface 40.

The stand-by switch 30 comprises: a cell buffer 31 for accumulating an input cell; a buffer controller 32 for controlling writing of cell into the cell buffer 31 and reading of cell from the cell buffer 31; and a first switching control cell detector 33 for detecting a switching control cell from a row of cells of the input signal S31 and notifying the buffer controller 32 of the switching control cell detection. In a general construction, the cell buffer 31 and the buffer controller 32 are provided for each input interface 10 or each output interface 40. In the embodiment shown here, however, a pair of cell buffer 31 and buffer controller 32 is provided for one input interface 10 and one output interface 40.

The output interface 40 has a selecting circuit 41 that, upon an instruction from an apparatus monitoring controller (not shown), selects an input signal S22 from the active switch 20 and an input signal S32 from the stand-by switch 30 which are then output (S41).

The operation according to the first preferred embodiment of the invention will be explained in conjunction with FIG. 3. Here for facilitating understanding of the invention, a hitless switching system will be described wherein the number of discard priority classes is two.

In the switching control cell generator 11, a switching control cell is inserted into the main signal S11 which has been input into the input interface 10. A section from which an instruction of insertion of the switching control cell is sent may vary depending upon the construction of the apparatus and the construction of the system. For example, an apparatus monitoring controller (not shown) is considered. The main signal S12 containing a switching controller cell is equally branched in the branch circuit 12 into an output signal S21 to be input into the active switch 20 and an output signal S31 to be input into the stand-by switch 30.

The first switching control cell detector 23 in the active switch 20, upon the detection of a switching control cell in a row of cells in the input signal S21, notifies (S23) the buffer controller 22 of the switching control cell detection. On the other hand, the second switching control cell detector 24, upon the detection of a switching control cell in a row of cells in the output signal S22, notifies (S27) the buffer controller 22 of the switching control cell detection and, at the same time, notifies (S28) the stand-by buffer controller 32 of the switching control cell detection.

A discard threshold value for discard low priority class (th–L) and a discard threshold value for discard high priority class (th–H) are previously set in the buffer controller 22. In general, the discard threshold value for the discard high priority class (th–H) is set equally to the cell buffer length, and the relationship 0<th–L<th–H is established.

The buffer controller 22 controls the number of cells accumulated in the cell buffer 21, and performs discard priority control as follows. In an ordinary state (in a period where equalization is not performed), when the number of cells accumulated within the cell buffer 21 is less than the threshold value for discard low priority (th–L), the input cell is written into the cell buffer 21 independently of the discard priority class of the input cell. On the other hand, when the number of accumulated cells is not less than the threshold value for discard low priority (th–L) and less than the threshold value for discard high priority (th–H), the discard high priority cell is written, while the discard low priority cell is discarded. When the number of accumulated cells is equal to the threshold values for discard high priority (th–H), all the input cells are discarded.

Upon the receipt of a notification (S23) of detection from the first switching control cell detector 23, equalization of the state of cell accumulation is initiated. When there is a notification (S36) of discard from the stand-by buffer controller 32 in addition to the ordinary discard priority control described above, the corresponding input cell is discarded also in the active switch 20. Upon a notification (S27) of detection from the second switching control cell detector 24, cell discard according to the notification (S36) of discard from the stand-by switch 30 is stopped, and the control is returned to ordinary discard priority control.

The first switching control cell detector 33 in the stand-by switch 30, upon the detection of a switching control cell in a row of cells in the input signal S31, notifies (S33) the buffer controller 23 of the switching control cell detection. A discard threshold value for discard low priority class (th–L) and a discard threshold value for discard high priority class (th–H) are previously set in the buffer controller 32. In general, the discard threshold value for the discard high priority class (th–H) is set equally to the cell buffer length, and the relationship 0<th–L<th–H is established.

The buffer controller 32 controls the number of cells accumulated in the cell buffer 31, and, in an ordinary state (in a period where equalization is not performed), performs discard priority control in the same manner as described above in connection with the active cell buffer 21.

Upon the receipt of a notification (S33) of detection from the first switching control cell detector 33, equalization of the state of cell accumulation is initiated, and all the cells, accumulated within the cell buffer 31, including the detected switching control cell are discarded to stop reading. At the same time, when there is a notification (S26) of discard from the active buffer controller 22 in addition to the ordinary discard priority control described above, the corresponding input cell is discarded also in the stand-by switch 30. Upon the receipt of a notification (S28) of detection from the second switching control cell detector 24 in the active switch, cell discard according to the notification (S26) of discard from the active switch 20 is stopped simultaneously with the restart of reading, and the control is returned to ordinary discard priority control.

The selecting circuit 41 in the output interface 40 selects and outputs (S41) any one of the input signal S22 from the active switch 20 and the input signal S32 from the stand-by switch 30. In general, since the selecting side is called "active system," the input signal S22 from the active switch 20 is selected.

The above equalization operation will be described following the transition of the state of accumulation of cells within the cell buffers (21, 31) in the active switch 20 and the stand-by switch 30.

FIGS. 5A to 5C are diagrams illustrating ordinary discard priority control. An embodiment will be described wherein the number of discard priority classes is two. In the drawing, an uppercase alphabetical letter (A) represents cells belonging to the discard high priority class, and a lowercase alphabetical letter (b) represents cells belonging to the discard low priority class. Hatched cells are cells that have already been accumulated in the cell buffers, and the discard priority class of the individual cells is unnecessary for the following description and hence will be omitted.

FIG. 5A shows such a state that the number of cells accumulated within the active cell buffer 21 is not less than the threshold value for discard low priority (th–L) while the number of cells accumulated within the stand-by cell buffer 31 is less than the threshold value for discard low priority (th–L). In this case, when discard high priority cell A is input, in both the cell buffers (21, 31), the number of accumulated cells is less than the threshold value for discard high priority (th–H). Therefore, the cell A is written into the cell buffers (21, 31), and this creates a state shown in FIG. 5B.

FIG. 5B shows a state after writing of the cell A. When a discard low priority cell b is input, since the number of cells accumulated within the active cell buffer 21 is not less than the threshold value for discard low priority (th–L), the cell b arrived at the active cell buffer 21 is discarded. On the other hand, in the stand-by cell buffer 31, the number of accumulated cells is less than the threshold value for discard low priority. Therefore, the cell b arrived at the stand-by cell buffer 31 is written. This creates a state shown in FIG. 5C.

FIGS. 6A to 6G are diagrams showing an embodiment of the operation of the switching system according to the first preferred embodiment of the invention. In this embodiment, the number of discard priority classes is two. In the drawing, uppercase alphabetical letters (A, C and the like) represent cells belonging to the discard high priority class, and lowercase alphabetical letters (b, e and the like) represent cells belonging to the discard low priority class. Hatched cells are cells that have already been accumulated in the cell buffers, and the discard priority class of the individual cells is unnecessary for the following description and hence will be omitted. X and Y represent switching control cells and are inherently the same cells. However, different symbols are assigned to distinguish the switching control cell input into the active cell buffer 21 from the switching control cell input into the stand-by cell buffer 31.

FIG. 6A shows such a state that the number of cells accumulated within the active cell buffer 21 is not less than the threshold value for discard low priority (th–L) while the number of cells accumulated within the stand-by cell buffer 31 is less than the threshold value for discard low priority (th–L). Since the switching control cells (X, Y) are control cells within the apparatus, wiring is possible so far as there is a space in the cell buffer. In this case, upon input of the switching control cells (X, Y), phase equalization is initiated, the switching control cell X is written in the active cell buffer 21, reading is stopped in the stand-by cell buffer 31, and the switching control cell Y and the already accumulated cells are discarded. This creates a state shown in FIG. 6B.

FIG. 6B shows a state immediately after the initiation of phase equalization. In this case, in both the cell buffers (21, 31), the number of accumulated cells is less than the threshold value for discard high priority (th–H). Therefore, the input discard high priority cell A is written into the cell buffers (21, 31), and this creates a state shown in FIG. 6C.

FIG. 6C shows a state after writing of the cell A. When a discard low priority cell b is input, since the number of cells accumulated within the active cell buffer 21 is not less than the threshold value for discard low priority (th–L), the input cell b is discarded. On the other hand, the number of cells accumulated within the stand-by cell buffer 31 is less than the threshold value for discard low priority (th–L). Therefore, originally, the input cell b is written. Since, however, the cell b has been discarded in the active cell buffer 21, the corresponding cell b is discarded also in the stand-by cell buffer 31. This creates a state shown in FIG. 6D. In this state, since reading from the stand-by cell buffer 31 is stopped, the cell A is not output.

When the same procedure is continued, 8 cell time after that, the switching control cell X is read from the active cell buffer 21. This creates a state shown in FIG. 6E. As is apparent from FIG. 6E, cells accumulated within the active cell buffer 21 are equal to cells accumulated within the stand-by cell buffer 31. Since the switching control cell X has been read from the active cell buffer 21, reading is restarted, followed by returning of the control to the ordinary discard priority control.

In the cell buffers (21, 31) in both the systems, since the state of cell accumulation is the same, after that, cell discard occurs in the same manner. Therefore, as shown in FIGS. 6F and 6G, the cell buffers (21, 31) in both the systems are identical to each other in the state of cell accumulation.

In this state, when the signal to be selected by the selecting circuit 41 in the output interface 40 is switched from the input signal S22 from the active switch 20 to the input signal S32 from the stand-by switch 30, the continuity of the row of cells is maintained between before the switching and after the switching. This can realize hitless switching.

FIGS. 7A to 7G are diagrams showing operation of the case where, when the state of cell accumulation is equalized, the state of cell discard in one cell buffer is not allowed to coincide with the state of cell discard in the other cell buffer. In order to confirm the effect of the invention, the state of cell accumulation in each buffer (21, 31) upon arrival of the switching control cells (X, Y), and the row of input cells are the same as those shown in FIG. 6.

FIG. 7A shows such a state that the number of cells accumulated within the active cell buffer 21 is not less than the threshold value for discard low priority (th–L) while the number of cells within the stand-by cell buffer 31 is less than the threshold value for discard low priority (th–L). In this case, upon input of the switching control cells (X, Y), phase equalization is initiated, the switching control cell X is written in the active cell buffer 21, reading is stopped in the stand-by cell buffer 31, and the switching control cell Y and the already accumulated cells are discarded. This creates a state shown in FIG. 7B.

FIG. 7B shows a state immediately after the initiation of phase equalization. In this case, in both the cell buffers (21, 31), the number of accumulated cells is less than the threshold value for discard high priority (th–H). Therefore, when a discard high priority cell A is input, it is written into the cell buffers (21, 31), and this creates a state shown in FIG. 7C.

FIG. 7C shows a state after writing of the cell A. When a discard low priority cell b is input, since the number of cells accumulated within the active cell buffer 21 is not less than the threshold value for discard low priority (th–L), the input cell b is discarded. On the other hand, the number of cells accumulated within the stand-by cell buffer 31 is less than the threshold value for discard low priority (th–L). Therefore, the input cell b is written into the cell buffer 31. This creates a state shown in FIG. 7D. Thus, in the prior art techniques, since discard priority control is carried out even during phase equalization independently of the state of cell discard in the other system, ordinarily discard priority processing as explained above in connection with FIG. 5 is carried out. In the stand-by cell buffer 31, since reading is stopped, the cell A is not output.

When the same procedure is continued, 8 cell time after that, the switching control cell X is read from the active cell buffer 21. This creates a state shown in FIG. 7E. As is apparent from FIG. 7E, although the number of cells accumulated within the active cell buffer 21 is equal to the number of cells accumulated within the stand-by cell buffer 31, the type of the cells accumulated within the active cell buffer 21 is different from that of the cells accumulated within the stand-by cell buffer 31. Since the switching control cell X has been read from the active cell buffer 21, reading from the stand-by cell buffer 31 is restarted.

In the state shown in FIG. 7E, the number of cells accumulated within the active cell buffer 21 is less than the threshold value for discard low priority (th–L). Therefore, when a discard low priority cell k is input, it is written into the cell buffer 21. On the other hand, in the stand-by cell buffer 31, since the number of cells accumulated is not less than the threshold value for discard low priority (th–L), the input cell k is discarded without writing into the cell buffer 31. This creates a state shown in FIG. 7F.

Next, upon input of a discard high priority cell L, the input cell L is written into both the cell buffers (21, 31) because in both the cell buffers (21, 31), the number of accumulated cells is less than the threshold value for discard high priority (th–H). This creates a state shown in FIG. 7G. Thereafter, writing control based on the same discard priority control is performed. In FIG. 7G, the active system is different from the stand-by system in output cell.

In this state, when the signal to be selected by the selecting circuit 41 in the output interface 40 is switched from the input signal S22 received from the active switch 20 to the input signal S32 received from the stand-by switch 30, in the output signal S41 in the output interface 40, the output cell C from the stand-by cell buffer 31 is continued after the output cell C from the active cell buffer 21. In this case, the same cell is output in a duplicated state. This makes it impossible to maintain the continuity of the row of cells between before switching and after switching. Therefore, hitless switching cannot be realized.

As is apparent from the foregoing description, according to the first preferred embodiment of the invention, during equalization of the state of accumulated cell, when cell discard has occurred in one system, the corresponding input cell is discarded also in the other system. This can avoid the occurrence of cell discard only in the cell buffer in one system.

Next, the operation according to the second preferred embodiment of the invention will be explained in conjunction with FIG. 4. For facilitating understanding of the invention, a hitless switching system will be explained wherein the number of discard priority classes is two.

In the switching control cell generator 11, a switching control cell is inserted into the main signal S11 which has been input into the input interface 10. A section from which an instruction of insertion of the switching control cell is sent may vary depending upon the construction of the apparatus and the construction of the system. For example, an apparatus monitoring controller (not shown) is considered as the section. The main signal S12 containing a switching control cell is equally branched in the branch circuit 12 into an output signal S21 to be input into the active switch 20 and an output signal S31 to be input into the stand-by switch 30.

The switching control cell detector 24 in the active switch 20, upon the detection of a switching control cell in a row of cells in the output signal S22, notifies (S28) the stand-by buffer controller 32 of the switching control cell detection. A discard threshold value for discard low priority class (th–L) and a discard threshold value for discard high priority class (th–H) are previously set in the buffer controller 32. In general, the discard threshold value for the discard high priority class (th–H) is set equally to the cell buffer length, and the relationship 0<th–L<th–H is established.

The buffer controller 22 controls the number of cells accumulated in the cell buffer 21, and performs discard priority control as follows. When the number of cells accumulated within the cell buffer 21 is less than the threshold value for discard low priority (th–L), the input cell is written into the cell buffer 21 independently of the discard priority class of the input cell. On the other hand, when the number of accumulated cells is not less than the threshold value for discard low priority (th–L) and less than the threshold value for discard high priority (th–H), the discard high priority cell is written, while the discard low priority cell is discarded. When the number of accumulated cells is equal to the threshold value for discard high priority (th–H), all the input cells are discarded. As soon as the stand-by buffer controller 32 notifies the active switch 20 of cell discard (S36), the corresponding input cell is discarded also in the active switch 20.

The first switching control cell detector 33 in the stand-by switch 30, upon the detection of a switching control cell in a row of cells in the input signal S31, notifies (S33) the buffer controller 32 of the switching control cell detection. A discard threshold value for discard priority class (th–L) and a discard threshold value for discard high priority class (th–H) are previously set in the buffer controller 32. In general, the discard threshold value for the discard high priority class (th–H) is set equally to the cell buffer length, and the relationship 0<th·L<th–H is established. Further, the buffer controller 32 controls the number of cells accumulated in the cell buffer 31, and performs discard priority control in the same manner as described above in connection with the active cell buffer 21.

Upon the receipt of a notification (S33) of detection from the first switching control cell detector 33, equalization of the state of cell accumulation is initiated, and all the cells, accumulated within the cell buffer 31, including the detected switching control cell are discarded to stop reading. Upon a notification (S28) of cell detection from the active second switching control cell detector 24, reading is restarted.

The selecting circuit 41 in the output interface 40 selects and outputs (S41) any one of the input signal S22 from the active switch 20 and the input signal S32 from the stand-by switch 30. In general, since the selecting side is called "active system," the input signal S22 from the active switch 20 is selected.

The second preferred embodiment of the invention is different from the first preferred embodiment of the invention in that, in the first preferred embodiment, only during equalization of the state of cell accumulation, the corresponding input cell is discarded according to discard information from other system, whereas in the second preferred embodiment, the function of discarding the corresponding input cell is always carried out according to discard information from other system.

FIG. 8 is an embodiment of the application of the switching system for an ATM switch according to the invention to a 4×4 output buffer type switch. The construction comprises four input interfaces 1110 to 1410, an active switch 1020, a stand-by switch 1030, and four output interfaces 1140 to 1440.

In the construction shown in FIG. 8, as with the construction shown in FIG. 3, the input interfaces 1110 to 1410 respectively have switching cell generators 1111 to 1411 and branch circuits 1112 to 1412.

The active switch 1020 comprises, corresponding respectively to the four output interfaces 1140 to 1440, cell buffers 1121 to 1421, buffer controllers 1122 to 1422, first switching control cell detectors 1123 to 1423, and second switching control cell detectors 1124 to 1424. A cell multiplexing circuit 1021 for time-sharing cell multiplexing of input signals S1120 to S1420 from the input interfaces 1111 to 1410 is further provided.

The stand-by switch 1030 comprises, corresponding respectively to the four output interfaces 1140 to 1440, cell buffers 1131 to 1431, buffer controllers 1132 to 1432, first switching control cell detectors 1133 to 1433, and second switching control cell detectors 1134 to 1434. A cell multiplexing circuit 1031 for time-sharing cell multiplexing of input signals S1130 to S1430 from the input interfaces 1111 to 1410 is further provided.

In the construction shown in FIG. 8, as with the construction shown in FIG. 3, the output interfaces 1140 to 1440 respectively have selecting circuits 1141 to 1441.

In this case, the construction shown in FIG. 8 is such that four sets of circuits shown in FIG. 3 are juxtaposed, except for provision of the cell multiplexing circuit 1021 within the active switch 1020 and the cell multiplexing circuit 1031 within the stand-by switch 1030.

The active and stand-by cell multiplexing circuits 1021 and 1031 function to perform time-sharing cell multiplexing of input signals received from the input interfaces 1110 to 1410 and to output the time-shared cell-multiplexed signals. In this case, the output signal speed in the cell multiplexing circuits 1021 and 1031 is four times higher than that of the input signal. Cells from all the input interfaces 1110 to 1410 are transmitted to output signals from the cell multiplexing circuits 1021 and 1031. In the switch 1020 (1030), they constitute a bus that is equally input into the cell buffers 1121 to 1421 (1131 to 1431).

Among the cells input into the cell buffers 1121 to 1421 (1131 to 1431), only cells to be input into the output interfaces 1140 to 1440 connected to the buffer controllers 1122 to 1422 (1132 to 1432) are written into the cell buffers 1121 to 1421 (1131 to 1431), while the other cells are discarded.

Thus, the function of switching (partition of cells) is realized by control of writing into the cell multiplexing circuit 1021 (1031) and the cell buffers 1121 to 1421 (1131 to 1431). In this case, when cells to be input into the output interfaces 1140 to 1440 connected to the cell buffer 1121 to 1421 (1131 to 1431) are compared with input cells of the cell buffer 21 (31) in the construction shown in FIG. 3, it is apparent that the construction shown in FIG. 8 is equivalent to that four sets of circuits shown in FIG. 3 are juxtaposed.

It can be regarded that the construction shown in FIG. 8 corresponding to such a construction that four sets of circuits shown in FIG. 3 are juxtaposed with the circuits being provided independently of one another. Since the operation of the circuits in each set are equal to the operation of the circuits in FIG. 3, the explanation thereof will be omitted. Further, as can be seen from FIG. 8, the switching control cell output from any of the input interfaces is subjected to cell multiplexing within the switch and then output. Therefore, the switching control cell may be output from any input interface.

Thus, according to the invention, when an input cell is discarded in one system, the corresponding cell is discarded also in the other system. Therefore, hitless switching can be realized in an ATM switch that supports a plurality of discard priority classes.

The invention has been described in detail with particular reference to preferred embodiments, but it will be understood that variations and modifications can be effected within the scope of the invention as set forth in the appended claims.

What is claimed is:

1. A switching system for an asynchronous transfer mode switch, comprising:

an input interface comprising a switching control cell generator for inserting a switching control cell into an input cell, and a branch circuit for branching a signal with the switching control cell inserted therein into two parts which are then output from the switching control cell generator and are input respectively into an active switch and a stand-by switch, said active switch comprising a cell buffer for accumulating a cell received from the branch circuit, a buffer controller for controlling writing into the cell buffer and reading from the cell buffer, a first active switching control cell detector for detecting a switching control cell from a row of cells received from the branch circuit and notifying the buffer controller of the switch control cell detection, and a second active switching control cell detector for detecting the switching control cell from a row of cells output from the cell buffer and notifying the buffer controller and the stand-by buffer controller of the switching control cell detection, the stand-by switch comprising a cell buffer for accumulating the cell received from the branch circuit, a buffer controller for controlling writing into the cell buffer and reading from the cell buffer, and a stand-by switching control cell detector for detecting the switching control cell from a row of cells received from the branch circuit and notifying the buffer controller of the switch control cell detection; and an output interface having a selecting circuit for selecting the output from any one of the active switch and the stand-by switch, wherein the active buffer controller discriminates a discard priority class of the input cell and controls the write or discard of the input cell according to the number of cells accumulated within the cell buffer and, when the input cell is discarded, notifies the stand-by buffer controller of the discard of the input cell, and, in a period between the receipt of a notification of switching control cell detection from the first active switching control cell detector and the receipt of a notification of switching control cell detection from the second active switching control cell detector, performs, in addition to a discard priority control, a discard control of the corresponding input cell upon a notification of the discard of the input cell from the stand-up buffer control, and the stand-by buffer controller discriminates the discard priority class of the input cell to control the write or discard of the input cell according to the number of cells accumulated within the cell buffer, and, at the time of discard of the input cell, notifies the active buffer controller of the discard of the input cells and, further, in a period between the receipt of a notification of switching control cell detection from the stand-by switching control cell detector and the receipt of a notification of switching control cell detection from the second active switching control cell detector, performs, in addition to the discard priority control, the discard control of the corresponding input cell upon the receipt of a notification of the discard of the input cell from the active buffet control, and, upon the receipt of a notification of switching control cell detection from the stand-by switching control cell detection, discards the input switch control cell and all the cells already accumulated within the stand-by cell buffer to empty the cell buffer, and, further, in this case, until the receipt of a notification of switching control cell detection from the second active switching control cell detector, stops reading of cells from the stand-by cell buffer to equalize the cell accumulated within the active cell buffer to the cell accumulated within the stand-by cell buffer.

2. The switching system for an asynchronous transfer mode switch according to claim 1, wherein the discard priority control controls the write or discard of the input cell based on two threshold values respectively for a discard high priority and a discard low priority, and, when the number of cells accumulated within the cell buffer is less than the threshold value for the discard low priority, all the cells input are written into the cell buffer; when the number of cells accumulated within the cell buffer is not less than the threshold value for the discard low priority and less than the threshold value for the discard high priority, among the cells input, the cells belonging to the discard low priority class are discarded, while the cells belonging to the discard high priority class are written into the cell buffer; and when the number of cells accumulated within the cell buffer is not less than the threshold value for the discard high priority, all the cells input are discarded.

3. The switching device system for an asynchronous transfer mode switch according to claim 1, which comprises a plurality of input interfaces each comprising a switching control cell generator for inserting a switching control cell into an input cell and a branch circuit for branching a signal with the switching control cell inserted therein into two parts which are then output from the switching control cell generator and input respectively into an active switch and a stand-by switch;

a first cell multiplexing circuit that conducts time-sharing cell multiplexing of cells received from each branch circuit of the plurality of input interfaces and outputs the time-share cell-multiplexed cells therefrom;

a plurality of active switches each comprising a cell buffer for accumulating the time-shared cell-multiplexed cells received from the first cell multiplexing circuit, a buffer controller for controlling writing into the cell buffer and reading from the cell buffer, a first active switch control cell detector for detecting a switch control cell from a row of cells received from the first cell multiplexing circuit and notifying the buffer controller of the switch control cell detection, and a second active switch control cell detector for detecting the switch control cell from a row of cells output from the cell buffer and notifying the buffer controller and the stand-by buffer controller of the switch control cell detection;

a second cell multiplexing circuit that conducts time-sharing cell multiplexing of cells received from each branch circuit of the plurality of input interfaces and outputs the time-share cell-multiplexed cells therefrom;

a plurality of stand-by switches each comprising a cell buffer for accumulating the time-shared cell-multiplexed cells received from the second cell multiplexing circuit, a buffer controller for controlling writing into the cell buffer and reading from the cell buffer, and a stand-by switch control cell detector for detecting the switch control cell from a row of cells received from the second cell multiplexing circuit and notifying the buffer controller of the switch control cell detection; and a plurality of output interfaces having a selecting circuit for selecting the output of any one of the active and stand-by switches.

4. A switching system for an asynchronous transfer mode switch, comprising:

an input interface comprising a switching control cell generator for inserting a switching control cell into an input cell, and a branch circuit for branching a signal with the switching control cell inserted therein into two parts which are then output from the switching control cell generator and are input respectively into an active switch and a stand-by switch, said active switch comprising a cell buffer for accumulating a cell received from the branch circuit, a buffer controller for controlling writing into the cell buffer and reading from the cell buffer, a first switching control cell detector for detecting a switching control cell from a row of cells output from the cell buffer and notifying the stand-by buffer controller of the switching control cell detection, the stand-by switch comprising a cell buffer for accumulating the cell received from the branch circuit, a buffer controller for controlling writing into the cell buffer and reading from the cell buffer, and a second switching control cell detector for detecting the switching control cell from a row of cells received front the branch circuit and notifying the buffer controller of the switch control cell detection; and an output interface having a selecting circuit for selecting the output from any one of the active switch and the stand-by switch, wherein the active and stand-by buffer controllers each discriminate a discard priority class of the input cell and control the write or discard of the input cell according to the number of cells accumulated within the active and stand-by cell buffers; when cell discard control is performed in one of the active and stand-by cell buffers control for discard of the corresponding input cell is performed in the other cell buffer; upon receipt of a notification of switching control cell detection from the second switching control cell detector, the stand-by buffer controller discards all the cells already accumulated within the stand-by cell buffer to empty the cell buffer, and, further, in this case, until the receipt of a notification of switching control cell detection from the first switching control cell detection, stops reading of cells from the stand-by cell buffer to conduct equalization of cells accumulated within the active and stand-by cell buffers.

5. The switching system for an asynchronous transfer mode switch according to claim 4, wherein a discard priority is performed which control controls a write or discard of the input cell based on two threshold values respectively for a discard high priority and a discard low priority, and, when the number of cells accumulated within the cell buffer is less than the threshold value for the discard low priority, all the cells input are written into the cell buffer; when the number of cells accumulated within the cell buffer is not less than the threshold value for the discard low priority and less than the threshold value for the discard high priority, among the cells input, the cells belonging to the discard low priority class are discarded, while the cells belonging to the discard high priority class are written into the cell buffer; and when the number of cells accumulated within the cell buffer is not less than the threshold value for the discard high priority, all the cells input are discarded.

6. The switching system for an asynchronous transfer mode switch according to claim 4, which comprises:

a plurality of input interfaces each comprising a switching control cell generator for inserting a switching control cell into an input cell and a branch circuit for branching a signal with the switching control cell inserted therein into two parts which are then output from the switching control cell generator and input respectively into an active switch and a stand-by switch;

a first cell multiplexing circuit that conducts time-sharing cell multiplexing of cells received from each branch circuit of the plurality of input interfaces and outputs the time-share cell-multiplexed cells therefrom;

a plurality of active switches each comprising a cell buffer for accumulating the time-shared cell-multiplexed cells received from the first cell multiplexing circuit, a buffer controller for controlling writing into and reading from the cell buffer and a first switching control cell detector for detecting the switching control cell from a row of cells output from the cell buffer and notifying the buffer controller of switching control cell detection;

a plurality of stand-by switches each comprising a cell buffer for accumulating the time-shared cell-multiplexed cell received from the second cell multiplexing circuit, a buffer controller for controlling writing into the cell buffer and reading from the cell buffer, and a second switching control cell detector for detecting the switching control cell from a row of cells received from the second cell multiplexing circuit and notifying the buffer controller of switching control cell detection; and a plurality of output interfaces having a selecting circuit for selecting the output of any one of the active and stand-by switches.

* * * * *